US010249113B2

(12) United States Patent
Whiteman

(10) Patent No.: US 10,249,113 B2
(45) Date of Patent: Apr. 2, 2019

(54) SECURE ENTRY SYSTEM

(71) Applicant: DE LA RUE INTERNATIONAL LIMITED, Hampshire (GB)

(72) Inventor: Robert Whiteman, Berkshire (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 0 days.

(21) Appl. No.: 15/318,168

(22) PCT Filed: Jun. 9, 2015

(86) PCT No.: PCT/GB2015/051682

§ 371 (c)(1),
(2) Date: Dec. 12, 2016

(87) PCT Pub. No.: WO2015/189594

PCT Pub. Date: Dec. 17, 2015

(65) Prior Publication Data

US 2017/0116797 A1 Apr. 27, 2017

(30) Foreign Application Priority Data

Jun. 12, 2014 (GB) .................................. 1410446.7

(51) Int. Cl.
*G07C 9/00* (2006.01)
*G06K 9/00* (2006.01)

(52) U.S. Cl.
CPC ..... *G07C 9/00087* (2013.01); *G07C 9/00007* (2013.01); *G06K 9/00442* (2013.01); *G07C 2009/00095* (2013.01)

(58) Field of Classification Search
CPC ........... G07C 9/00007; G07C 9/00087; G07C 2009/00095; G07C 2209/12; G06K 9/00442; G06K 7/1417; G06K 19/06028
See application file for complete search history.

(56) References Cited

U.S. PATENT DOCUMENTS 3,350,800 A 11/1967 Witt et al.
3,821,518 A 6/1974 Miller
(Continued)

FOREIGN PATENT DOCUMENTS

EP 1810841 A2 7/2007
EP 2518696 A1 10/2012
(Continued)

OTHER PUBLICATIONS

Aug. 28, 2015 International Search Report issued in Patent Application No. PCT/GB2015/051682.
(Continued)

*Primary Examiner* — Thomas D Alunkal
(74) *Attorney, Agent, or Firm* — Oliff PLC

(57) ABSTRACT

A secure entry system is provided. The secure entry system includes an authorization apparatus including a reader for reading data, and a record medium, in which the record medium is presented to the reader, and characterized in that the reader and the record medium or a member connected to the record medium include one or more pairs of visible and/or tactile markings which, only when the record medium is correctly presented to the reader, cooperate with one another in a predetermined manner.

14 Claims, 4 Drawing Sheets

(56) References Cited

U.S. PATENT DOCUMENTS 5,686,725 A * 11/1997 Maruyama ............... G06K 7/12 250/271
6,138,913 A * 10/2000 Cyr ........................ G06K 19/14 235/468
6,269,169 B1 * 7/2001 Funk .................. G07C 9/00071 283/72
2003/0057286 A1 * 3/2003 Yamagishi ........... G06K 19/025 235/492
2004/0081332 A1 * 4/2004 Tuttle ................. G06K 9/00442 382/100
2005/0236489 A1 10/2005 Droz
2006/0065714 A1 3/2006 Jesme
2008/0296394 A1 * 12/2008 Melnik .................. G06Q 10/02 235/485
2009/0050700 A1 * 2/2009 Kamijoh ............ G06K 17/0022 235/440
2009/0268260 A1 10/2009 Ohira et al.
2010/0046016 A1 2/2010 Wang et al.
2011/0090046 A1 4/2011 Johnson et al.
2011/0277518 A1 * 11/2011 Lais ................... G07C 9/00087 70/101
2012/0320429 A1 * 12/2012 Baxter ............... H04N 1/00408 358/474

FOREIGN PATENT DOCUMENTS

WO 2005/104024 A1 11/2005
WO 2010/098142 A1 9/2010

OTHER PUBLICATIONS

Dec. 9, 2015 European Search Report issued in Great Britiain Patent Application No. 1510024.1.

* cited by examiner

SECURE ENTRY SYSTEM

The invention relates to a secure entry system.

Secure entry systems are used in a wide variety of applications to control access to buildings, rooms, sports stadia, countries and the like. A typical secure entry system comprises authorisation apparatus including a reader for reading data from a record medium presented to the reader by a user.

In many situations, particularly border controls, sports stadia and the like, a secure entry system is commonly required to process a large number of users in as short a time as possible. This might occur at an airport, for example, where a number of planes arrive at similar times and all passengers need to be securely processed and admitted (or not) into the country. Other examples include secure entry systems to stadia for sporting events where again a large number of people need to be securely authorised in a short time.

Known secure entry systems have been implemented but often they fail to successfully authorise a user and the user then has to be redirected to a manual authorisation station. This slows down the authorisation process and requires multiple staff members to be available to assist users.

There is therefore a need to improve such secure entry systems to increase the rate at which they can authorise users and thus speed up the overall authorisation process while reducing the number of times a manual authorisation has to be performed.

In accordance with a first aspect of the present invention, a secure entry system comprises authorisation apparatus including a reader for reading data, and a record medium, wherein the record medium is presented to the reader, and characterised in that the reader and the record medium or a member connected to the record medium include one or more pairs of visible and/or tactile markings which, only when the record medium is correctly presented to the reader, cooperate with one another in a predetermined manner.

The inventor has realised that one of the problems with the use of conventional secure entry systems is that readers require the record medium to be presented to them in a particular orientation without significant tolerance and it is often difficult for a user to achieve this. The user may be unfamiliar with the reader or may not realise that although they have presented the record medium in an apparently acceptable manner, it is not sufficiently well presented for the reader to read data from it.

A further advantage is that the markings can easily be added to otherwise conventional readers and record media.

By including one or more pairs of markings, one of each pair on the record medium or member connected to the record medium, and the other on the reader, it becomes much easier for a user to correctly present the record medium to the reader by simply checking that the markings cooperate with one another in the predetermined manner.

If visible markings are used they may or may not also be tactile, while if tactile markings are used, they may or may not be visible. In most cases, a pair of markings will be of the same type—visible or tactile but in other examples one may be visible (and optionally tactile) while the other is tactile and not clearly visible. A tactile marking may not be visible if it is formed of a clear embossing or the like.

In a very simple application, the “data” that is read from the record medium is simply the presence or otherwise of indicia or an object, such as an electronic chip, in or on the record medium. This provides a relatively low level of authorisation.

In more sophisticated examples, the authorisation apparatus further comprises an input device for detecting information about a person presenting the record medium, and an analyser for comparing the detected information with the read data, such as biodata, and for allowing entry if a satisfactory comparison is achieved. This provides a higher level of authorisation in that the person presenting the record medium is authorised rather than simply acknowledging the possession of the record medium. Such embodiments can be used in the context of geographical border controls and the like.

In some embodiments, the authorisation apparatus is adapted to determine whether the markings cooperate with one another in the predetermined manner. For example, the apparatus could include an imaging device for detecting images of visible markings and then checking for the correct cooperation.

In preferred embodiments, however, the cooperation, between the pair of markings is visible and/or detectable by touch to the person presenting the record medium. This presents a lower cost approach but also enables the cooperation to be checked quickly and conveniently by the person presenting the record medium.

In the simplest embodiments, a single pair of markings is provided but occasionally this can lead to ambiguities if, to the relatively unskilled user, the markings appear to be correctly cooperating when in fact the orientation of the record medium is not correct. This problem can be significantly reduced if each of the reader and record medium or the member connected to the record medium is provided with at least two pairs of visible and/or tactile markings, the members of each pair cooperating together in a predetermined manner when the record medium is correctly presented to the reader. By having at least two pairs of markings, it will only usually be possible to present the record medium in a single orientation to the reader to achieve the desired cooperation.

In some cases, the members of each pair of markings are identical. This makes production of the markings on the reader and record medium or member connected to the record medium a simple task and has the benefit of users easily recognizing the markings for what they are. However, in order to reduce the risk of misorientation, in preferred examples, the members of each pair of markings differ from the members of the or each other pair of markings so as to introduce an asymmetry. This will mean that a number of unique pairings will be achieved which can be easily detected by the user. The markings could differ by being mirror images of one another, having the same shape but different colours, having the same colour but different shapes, or being in the form of alphanumeric characters spelling a word, or other known pairings of symbols.

The markings may differ from one another in a variety of ways including one or more of colour, shape, surface texture, size and/or graphic design.

Visible markings may also be or incorporate security devices such as holograms, security inks, perforations and embossings.

The predetermined manner in which the visible markings cooperate is preferably based on their relative geometric location, typically being arranged side by side when a record medium is correctly positioned relative to the reader. In other examples, the markings could be vertically aligned. This could be achieved if one of the markings (typically visible) is provided in or adjacent a transparent or semitransparent part of the record medium or member connected to the record medium allowing the other marking to be viewed.

In one example, the reader includes a border region extending alongside a record medium presenting region, the border region having one of the or each pair of markings so that when the record medium is correctly presented on the record medium presenting region, the corresponding pairs of markings are aligned with one another. Typically, the record medium is slid along the presenting region to bring the markings into alignment or alternatively the record medium can be simply placed down onto the presenting region.

Examples of record media include identification cards, driving licenses, visas or page of a security booklet such as a passport. In the latter case, one member of the or each pair of visible markings may be provided on an outer surface of a cover of the security booklet.

In particularly preferable embodiments, at least one of the one or more pairs of visible and/or tactile markings are substantially invisible when illuminated by a natural light, and become visible when illuminated by a light having a wavelength outside the visible wavelength range, and the authorisation apparatus further comprises a light source configured to illuminate said at least one of the one or more pairs of visible and/or tactile markings with light having the wavelength outside the visible wavelength range. Preferably, the light having a wavelength outside the visible wavelength range is a light having a wavelength in the ultraviolet wavelength range. In one example, the light source is an illuminating hood configured to illuminate at least the reader.

In embodiments having markings that are substantially invisible in natural light, it is preferable that the markings are only made visible when the record medium is brought close to the reader. Therefore, preferably the authorisation apparatus further comprises a sensor configured to sense one or more of a person presenting the record medium and the record medium presented to the reader, and a controller configured to switch on the light source in response to the sensor sensing one or more of the person presenting the record medium and the record medium presented to the reader. Alternative embodiments are foreseen in which, for example, the intensity of the light source is increased and decreased instead of the light source being switched on and off.

In embodiments having markings that are substantially invisible in natural light, the or each pair of markings included on the record medium or the member connected to the record medium may be substantially invisible when illuminated by a natural light, and the or each pair of markings included on the reader substantially visible when illuminated by natural light. Alternatively, all of the one or more pairs of visible and/or tactile markings may be substantially invisible when illuminated by a natural light, and become visible when illuminated by a light having a wavelength outside the visible wavelength range.

In accordance with a second aspect of the present invention, we provide a record medium for use in a secure entry system according to the first aspect of the invention, the record medium or a member connected to the record medium including one or more pairs of visible and/or tactile markings which, when the record medium is correctly presented to the reader of the secure entry system, cooperate with a corresponding member in the reader in the predetermined manner.

In accordance with a third aspect of the present invention, we provide a security booklet for use in a secure entry system according to the first aspect of the invention, the security booklet including a record medium incorporating secure data such as biodata, the security booklet having a cover on an outer surface of which one member of one or more pairs of visible and/or tactile markings is provided such that when the record medium is correctly presented to the reader of the secure entry system, the member will cooperate with the other member of the marking pair on the reader in the predetermined manner.

In accordance with a fourth aspect of the present invention, we provide authorisation apparatus for use in a secure entry system according to the first aspect of the invention, the apparatus including a reader for reading data from a record medium presented to the reader, the reader including one member of one or more pairs of visible and/or tactile markings which, when a record medium is correctly presented to the reader, cooperates with the other member of the pair of visible and/or tactile markings on the record medium or a member connected to the record medium in the predetermined manner.

Some examples of security entry systems according to the invention will now be described with reference to the accompanying drawings, in which:—

Figure 1:
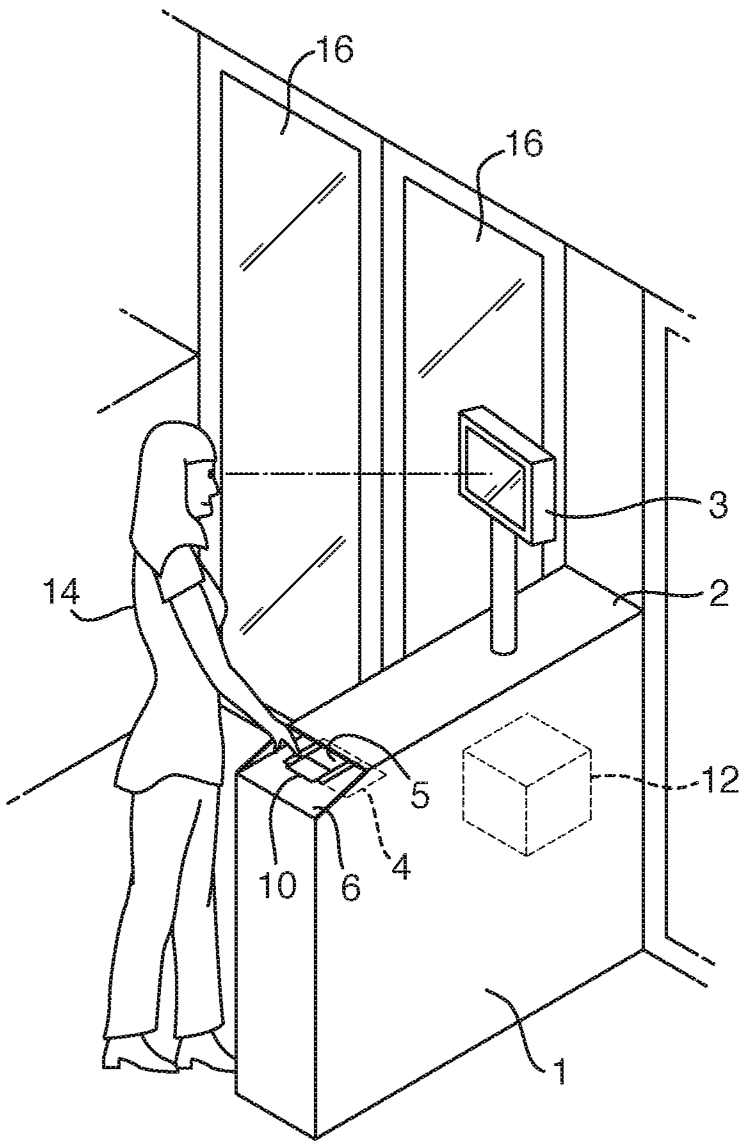
FIG. 1 is a schematic, perspective view of an example of a secure entry system according to the invention.

A typical secure entry system for authorising entry at a geographical border is shown schematically in FIG. 1. The system includes a reader housing 1 having an upper surface 2 on which is mounted a camera assembly 3. A passport biodata reader 4 of conventional form is located in the housing 1 beneath the surface 2 and cooperates with an entry slot 5 at the rear end of a passport 10 presenting region 6 formed in the housing 1.

The reader 4 outputs signals, representing biodata read from a passport 10 presented to it, to a control processor 12 located in the housing 1. Image data from the camera 3 representing the image of the face of a person 14 is also fed to the control processor 12 which then makes a comparison of the image data from the person 14 presenting the passport with the biodata read from the passport and, if a sufficient match is obtained, causing a pair of doors 16 to open and allow the user to pass through.

The reader 4 includes an upper surface 20 comprising an opaque border region 22 extending around three sides and a central, transparent region 24 defining a record medium presenting region made of plastic or glass. A passport 10 is placed by the user on the region 22, part of which is located in the slot 5 of the housing 1. Information on a data page in the passport is read by the reader 4 through the transparent region 24. It is therefore important to ensure that the passport is correctly aligned to enable that data to be read.

Figure 3:
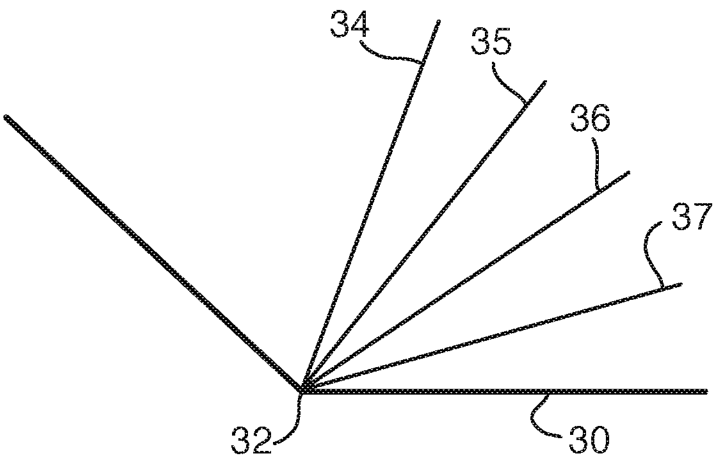
FIG. 3 illustrates a security booklet such as a passport.

A typical passport construction is shown in FIG. 3. This comprises an outer cover 30 folded about a fold line 32 and including a number of inner pages 34-37. The page 34 is a data page and carries information about the holder of the passport such as biodata in machine-readable form, for example on a chip, barcode or the like, together with other readable information such as a photo image, name, date of birth and the like. In order that the reader 4 can read this data, the passport must be opened to present the page 34 face down onto the presenting region 24 leaving the cover 30 fully open and visible from above.

Figure 2:
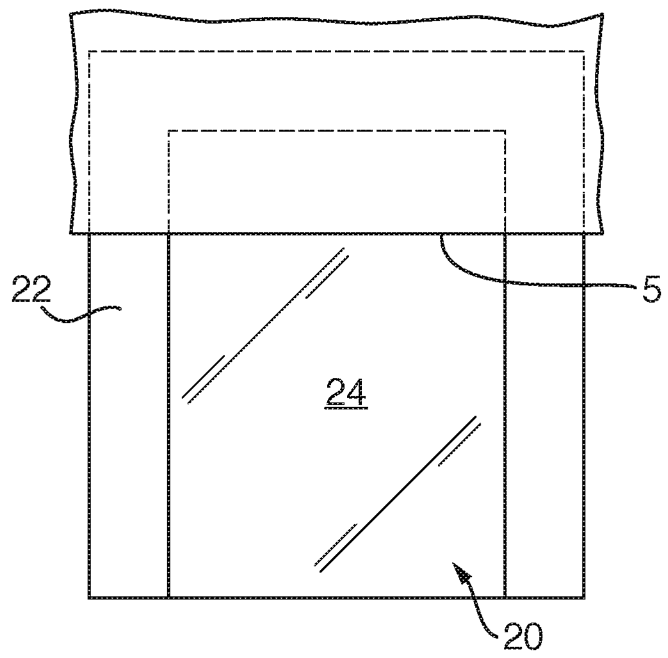
FIG. 2 illustrates part of the reader shown in FIG. 1.

In order to achieve correct alignment, the cover 30 on its outer surface and the border region 22 of the reader 20 are provided with at least one cooperating pair of visible markings (not shown in FIG. 2).

FIGS. 4A-4D illustrate some examples of two cooperating pairs of visible markings.

Figure 4A:
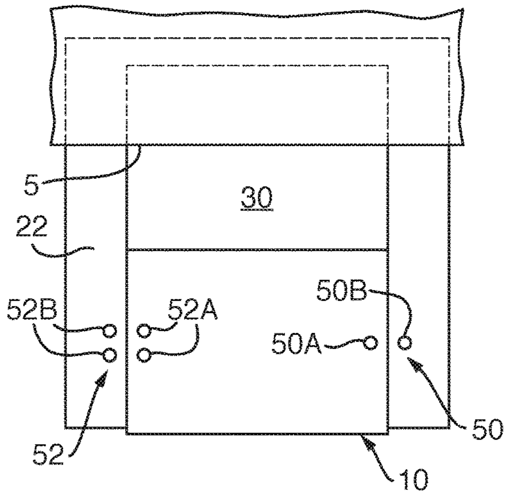
FIGS. 4A-4D illustrate a number of different examples of a passport and reader indicating the visible markings used in which the visible markings of each pair are mirror images; and, FIG. 5 illustrates further examples of pairs of visible markings.

In the example shown in FIG. 4A, two pairs of visible markings are provided indicated at 50,52 respectively. The pair of visible markings 50 comprises a pair of white dots 50A,50B, the dot 50B being provided on the right hand side of the opaque border region 52 and the dot 50A on the right hand side of the passport cover 30.

The second pair of visible markings 52 comprises a pair of white dots 52B on the left hand side of the opaque border region 52 and a pair of white dots 52A on the left hand side of the passport cover 30.

When the passport 10 is correctly aligned with the reader, the two pairs of visible markings 50,52 are arranged in the (predetermined) manner shown in FIG. 4A with the dots 50A,50B being adjacent one another and aligned, while each of the dots 52A,52B are aligned and adjacent one another. This is visible to the user since only the leading part of the passport 10 is located in the slot 5 and thus the user can see very easily that alignment has been achieved.

It will readily apparent that there are many different combinations of visible markings which can be used.

Figure 4B:
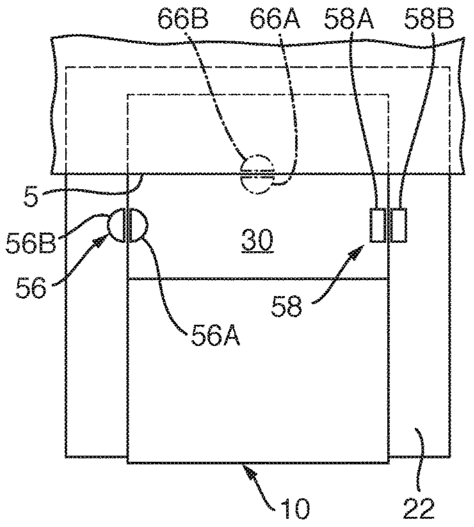

In FIG. 4B, two pairs of visible markings 54,56 are provided, the visible marking pair 56 comprising half-moon shapes 56A,56B and the other pair comprising rectangular markings 58A,58B. In this example, the markings 46A,58A are provided on the leading side of the cover 30 although they will still be visible to the user as they will not be inserted into the slot shown at 5.

Figure 4C:
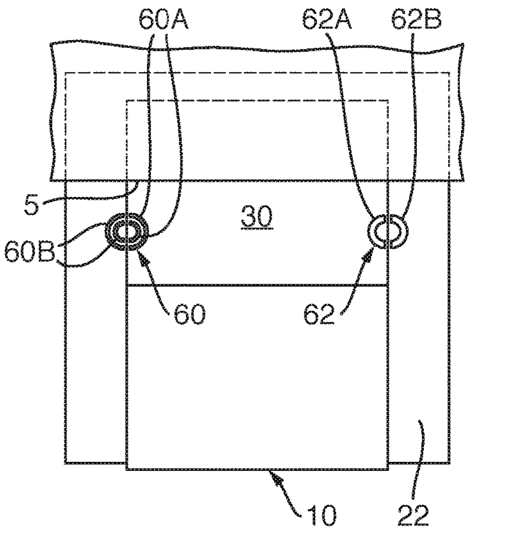

FIG. 4C illustrates a third example. In this case, two pairs of visible markings 60,62 are provided. The marking 60 comprises two sets of concentric half circles 60A,60B which, when the passport 10 is correctly aligned with the reader, form complete concentric circles as shown in FIG. 4C. The markings 62 comprise two half circles 62A,62B which form a complete circle as shown in FIG. 4C when the passport 10 is correctly aligned.

Figure 4D:
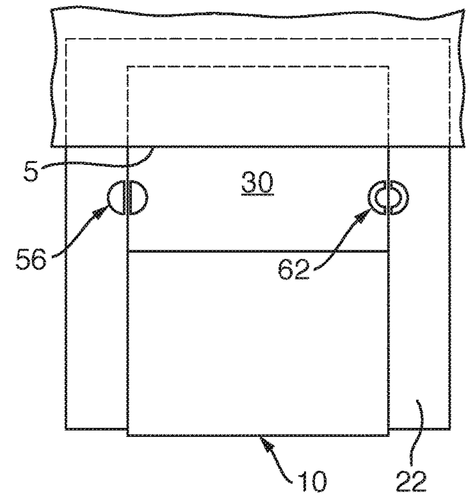

In the example of FIG. 4D, the marking 62 is the same as in FIG. 4C while the marking 56 is the same as in FIG. 4B.

In each example, the two pairs of markings 50,52; 56,58; 60,62; and 56,62 differ from one another so reducing the risk of misalignment. However, it would be possible to use just one pair of markings or more than one pair of identical markings. In addition, within each pair the markings may be the same (FIG. 4A) or different (FIGS. 4B-4D).

In all these examples, the markings have been provided on the sides of the passport 10 and border region 22. In addition, or alternatively, a marking could be provided on the part of the housing above the slot 5 with a cooperating marking on the cover at a position such that the two markings are aligned when the passport is fully inserted into the slot. This is shown in dashed lines in FIG. 4B where a semi-circular marking 66B is provided on the housing and a cooperating marking 66A on the cover 30 inset from its leading edge located in the slot 5.

In these examples, the markings are distinguished by their shapes and in each case the markings in each pair are mirror images of one another.

There are many other ways in which different markings could be provided, particularly by using different colours, graphic designs, alphanumeric characters, etc. FIG. 5 illustrates just a few of these examples and it will be understood that the different characteristics can be combined in many different ways. The important feature is that once the passport is correctly aligned with the reader, a visually recognisable cooperation will be determined by the user between the members of each pair of visible markings.

Figure 5A:
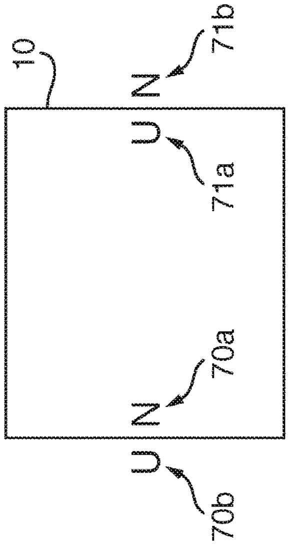

FIG. 5A illustrates a document such as a page of a passport 10 on which markings 70*a* (N) and 71*a* (U) are provided. When the passport is in its correct position on the reader (not shown), the markings 70*a*, 71*a* are aligned with markings 70*b* (N), 71*b* (U) on the reader which form the same abbreviation "UN" which could be a country abbreviation or the like.

Figure 5B:
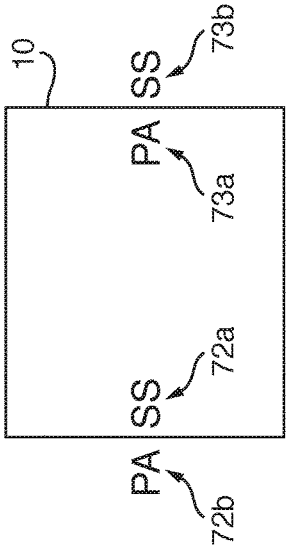

FIG. 5B illustrates markings 72*a* (SS) and 73*a* (PA) on the passport page which cooperate with markings 72*b* (PA) and 73*b* (SS) respectively so spelling out the same word "PASS".

Figure 5C:
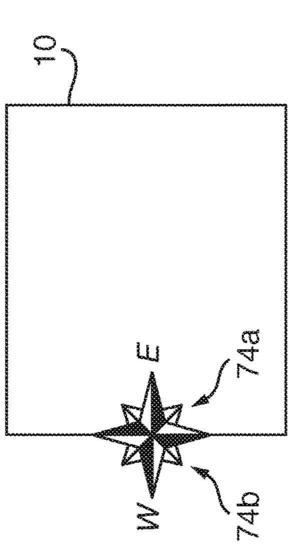

FIG. 5C illustrates a document 10 having a single marking 74*a* which cooperates with the marking 74*b* on the reader so as to form a complete graphic design.

Figure 5D:
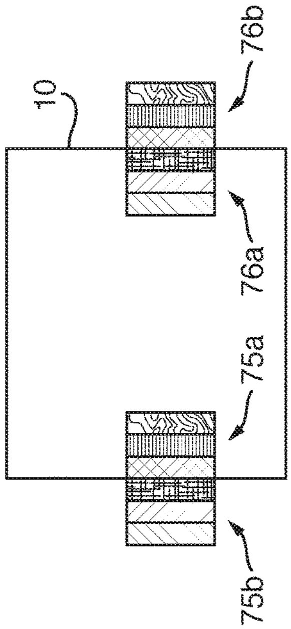

Finally, FIG. 5D illustrates markings 75*a* and 76*a*, each of which exhibits part of a rainbow pattern and cooperates with corresponding rainbow patterns 75*b* and 76*b* on the reader to form a full rainbow spectrum. Thus, marking 75*a* is the same as 76*b* and marking 76*a* is the same as marking 75*b*.

While the markings of the above examples are described as visible markings, in other embodiments the markings on either or both of the reader and the record medium may be invisible when viewed under normal lighting conditions, and become visible when viewed under light having a wavelength outside of the visible wavelength range, and further, may become visible when the record medium is presented to the reader.

For example, the embodiment of FIG. 4A may have markings 50A, 52A printed on the passport 10 in a fluorescent ink which only becomes visible when illuminated by ultraviolet light. The region of the entry slot 5 on the reader housing 1 may have an ultraviolet light incorporated therewithin, preferably in the form of an illuminating hood, which is configured to illuminate the markings 50A, 52A when the passport 10 is presented to the reader. In some embodiments the markings on the reader 50B, 52B may be visible in natural light while the markings on the record medium 50A, 52A are only visible under ultraviolet light. Alternatively, the markings on the reader 50B, 52B may also be invisible under natural light, and may become visible when illuminated by the same ultraviolet light that illuminates the record medium. Further, the ultraviolet light may be configured to switch on in response to a sensor sensing, for example, a person 14 approaching the reader, or preferably a sensor sensing that the record medium has been presented to the reader, thereby allowing the person presenting the record medium to achieve correct alignment. While the above is described with reference to FIG. 4A, it will be appreciated that the markings of any of the above embodiments could be configured to be activated by ultraviolet light, as described.

In further examples, the surface texture of the markings could be used to distinguish between them and determine the required cooperation. The surface texture of the markings could be varied by using gloss/matt inks or varnishes, tactile inks such as those described in WO2009106799, or embossing directly into the surface of the substrate or into a coating applied onto the substrate.

The markings can be provided on the cover 30 of the passport in any conventional manner including printing, embossing, foil transfer, laser marking, perforations either produced mechanically or by a laser and the like. The markings on the opaque border 22 of the reader can also be provided by printing or coating, moulding, laser marking etc.

In the examples described so far, markings have been shown provided on the passport cover 30. In other examples, markings could be provided on the data page 34 or any other designated page and this will depend on the nature of the reader. In the case of identification cards, the markings will be provided directly on the cards themselves.

The invention claimed is:

1. A secure entry system comprising:

an authorization apparatus including a reader for reading data, the reader including a transparent record medium presenting region and a border region extending alongside the transparent record medium presenting region; and a record medium; wherein the record medium is configured to be presented to the reader, the reader and the record medium or a member connected to the record medium include at least two pairs of visible markings, the reader includes a first member of each of the pairs of markings, the first member of each of the pairs of markings being located in the border region of the reader, and the record medium or the member connected to the record member includes a second member of each of the pairs of markings, the first and second members of each pair cooperating together in a predetermined manner only when the record medium is correctly presented to the reader, and cooperation between the two pairs of visible markings is visible to a person presenting the record medium to the reader by placing the record medium face down onto the transparent record medium presenting region as the markings of each pair being disposed side by side and the first member of each of the pairs of markings being alongside a respective different lateral edge of the record medium when the record medium is correctly presented to the reader.

2. The system according to claim 1, wherein the members of each pair of markings differ from the members of the or each other pair of markings.

3. The system according to claim 1, wherein the members of each pair of markings are identical.

4. The system according to claim 1, wherein the members of each pair of markings have different appearances which relate to one another.

5. The system according to claim 4, wherein the members of a pair of markings are mirror images of one another.

6. The system according to claim 1, wherein the authorization apparatus further comprises an input device for detecting information such as biodata about a person presenting the record medium, and an analyzer for comparing the detected information with the read data and for allowing entry if a satisfactory comparison is achieved.

7. The system according to claim 1, wherein the markings are or incorporate security devices such as holograms, security inks, perforations and embossings.

8. The system according to claim 1, wherein the record medium forms part of a security booklet and one member of the or each pair of markings is provided on an outer surface of a cover of the security booklet.

9. The system according to claim 1, wherein at least one of the at least two pairs of visible markings are substantially invisible when illuminated by a natural light, and become visible when illuminated by a light having a wavelength outside a visible wavelength range, and wherein the authorization apparatus further comprises a light source configured to illuminate the at least one of the at least two pairs of visible markings with light having the wavelength outside the visible wavelength range.

10. The system according to claim 9, wherein the light source is an illuminating hood configured to illuminate at least the reader.

11. The system according to claim 9, wherein the authorization apparatus further comprises:

a sensor configured to sense one or more of a person presenting the record medium and the record medium presented to the reader; and a controller configured to switch on the light source in response to the sensor sensing one or more of the person presenting the record medium and the record medium presented to the reader.

12. The system according to claim 9, wherein the or each pair of markings included on the record medium or the member connected to the record medium are substantially invisible when illuminated by a natural light, and the or each pair of markings included on the reader are substantially visible when illuminated by natural light.

13. The system according to claim 9, wherein all of the at least two pairs of visible markings are substantially invisible when illuminated by a natural light, and become visible when illuminated by a light having a wavelength outside a visible wavelength range.

14. An authorization apparatus for use in a secure entry system having a record medium, the authorization apparatus including a reader for reading data from the record medium presented to the reader, the reader including a transparent record medium presenting region and a border region extending alongside the transparent record medium presenting region, the reader including two members of two pairs of visible markings located in the border region of the reader which, when the record medium is correctly presented to the reader, cooperate with other members of the two pairs of visible markings on the record medium or a member connected to the record medium in a predetermined manner, wherein cooperation between the two pairs of visible markings is visible to a person presenting the record medium to the reader by placing the record medium face down onto the transparent record medium presenting region as the markings of each pair being disposed side by side and the member of each of the pairs of markings on the reader being alongside a respective different lateral edge of the record medium when the record medium is correctly presented to the reader.

* * * * *